June 14, 1949.   R. SEIPT ET AL   2,473,307
SHIM
Filed Feb. 21, 1948   2 Sheets-Sheet 1
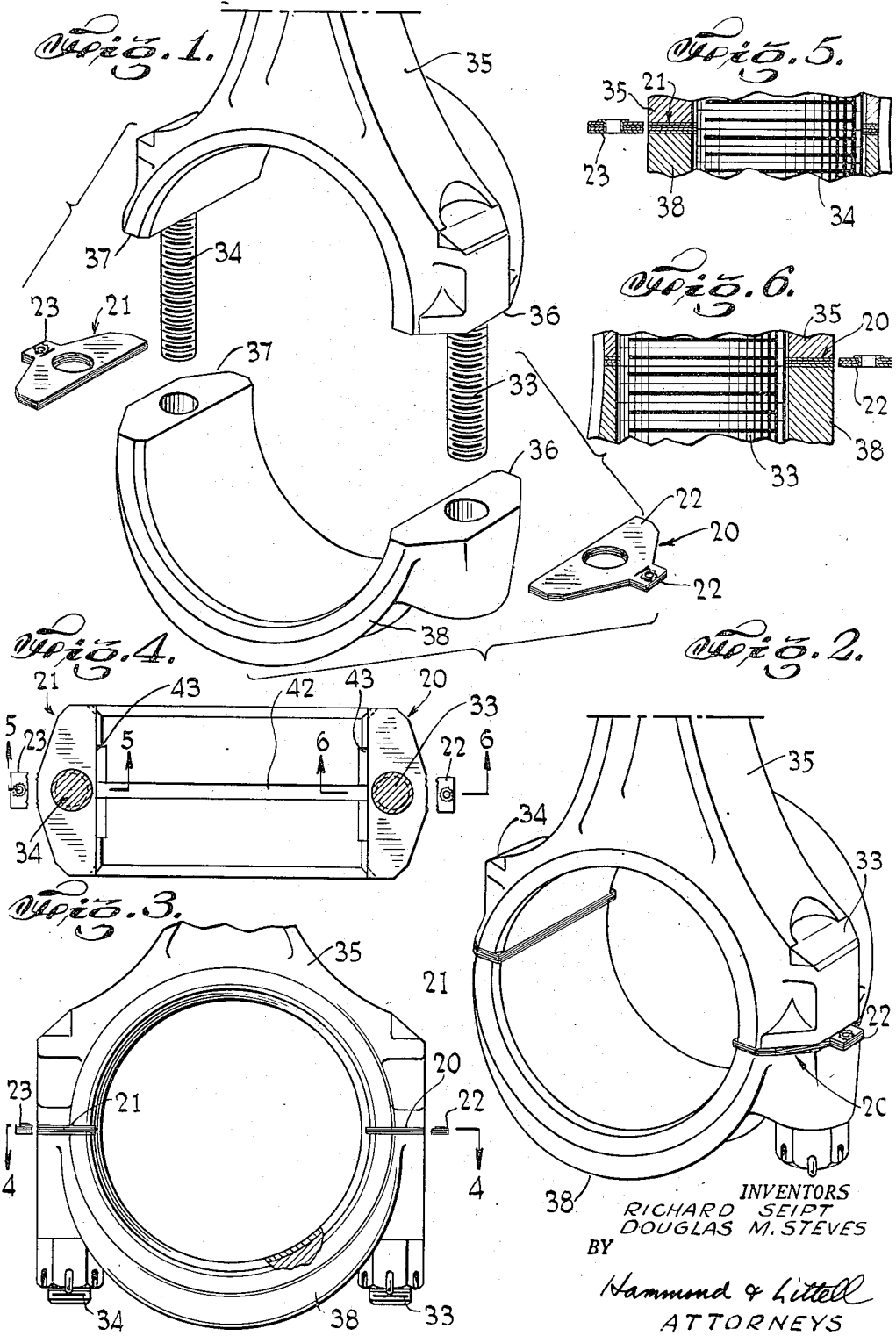
INVENTORS
RICHARD SEIPT
DOUGLAS M. STEVES
BY
Hammond & Littell
ATTORNEYS

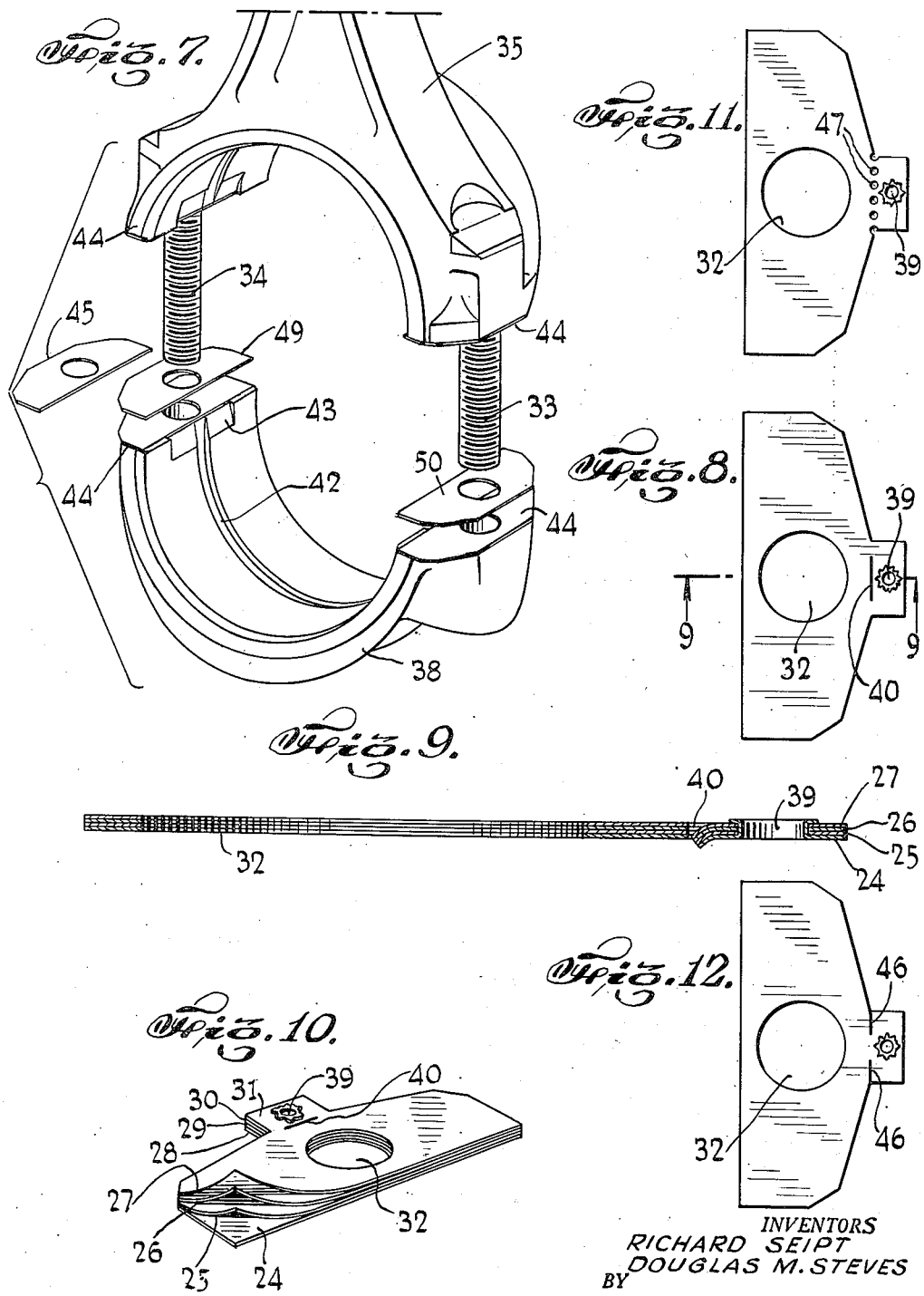

Patented June 14, 1949

2,473,307

UNITED STATES PATENT OFFICE 2,473,307

SHIM

Richard Seipt, Darien, and Douglas M. Steves, Tuckahoe, N. Y., assignors to Laminated Shim Company, Glenbrook, Conn., a corporation of Connecticut Application February 21, 1948, Serial No. 10,085

10 Claims. (Cl. 308—244)

1

This invention relates to shims for use in conjunction with split bearings or the like, and particularly to a shim structure having a plurality of shim leaves which are to be temporarily joined during the assembly of the bearing or other machine part, the leaves being adapted to be detached from each other after the assembly.

Shims are used in conjunction with split or divided bearings and other similar machine parts to obtain the proper clearance between the portions of the bearings or the machine parts, and elements supported thereby. In order to facilitate adjustment of the bearing or machine parts, a plurality of shim leaves of predetermined thickness can be used in place of a solid shim. It is difficult to assemble and handle a plurality of very thin leaves of a shim at the point of use and such would be impracticable for quantity production. The thin leaves are hard to pick up in the fingers and to arrange in proper order.

Shims having a plurality of shim leaves with their surfaces bonded together are known. In order to reduce the thickness of such a shim, it is necessary to insert a knife-edge into the edge of the shim in order to remove a leaf or leaves, which operation may consume considerable time. In the assembly of bearings and machine parts, it frequently is desirable to initially adjust, set-up, or assemble the bearing elements or machine parts with shims therebetween and thereafter to reduce the thickness by at least one of the shims a predetermined amount so as to reduce the clearance between the bearing portions or machine parts. Such a problem arises, for example, in the manufacture and assembly of the connecting rod bearing for an internal combustion engine.

It is difficult in quantity production to use a shim which after initial assembly must be removed and then reduced in thickness by using a knife-edge or similar means for separating leaves from the shim which are bonded to the surface of the bodies of other leaves of the shim.

One of the objects of the invention is to provide a shim facilitating assembly of divided bearings or the like where the shim is to be reduced in thickness after an initial adjustment or assembly of the parts.

Another of the objects of the invention is to provide a shim having a plurality of body elements which can be picked up with ease as a unit and put in place in the machine part with which it is to be assembled.

One of the features of the invention is a shim having a plurality of body elements temporarily joined together in stacked relationship by means

2 of tabs extending from the body elements. A joining means, such as a rivet means extending through the tabs, will hold the shims in said temporary assembled relationship.

As an example of one use of the present invention, the shims can be employed for an internal combustion engine connecting rod bearing. In such a bearing, the cap is assembled to the connecting rod with a plurality of shim leaves between each side of the rod and cap. After the bearing has been formed and before placing on the crankshaft, it is desirable to be able to remove one or more of the shim leaves so as to obtain proper clearance with the crankshaft. In such an event, it is necessary that it be possible to perform the leaf removal operations quickly and with the minimum loss of time. This requires that the leaves not be bonded together.

When the connecting rod is tinned before the anti-friction bearing metal is formed therein, it is desirable that steps be taken to prevent bonding of the leaves to each other. One example of preventing such a bonding is by making the outer leaves of brass or the like, and the inner leaves of a dissimilar metal such as aluminum or the like. The bearing cap is assembled on the connecting rod before the anti-friction metal bearing halves are formed, shims being placed between each of the mating portions of the cap with the connecting rod. In this particular type of bearing, the shim on one side of the cap can have two outer brass leaves and one aluminum leaf therebetween. The shim on the other side can have two outer brass leaves and two inner aluminum leaves.

After assembly of the bearing cap on the connecting rod, the assembly can be dipped into a tinning bath. Thereafter, the tinned connecting rod assembly can have the anti-friction metal such as babbitt or the like formed in place or otherwise. At this time, if desired, suitable oil grooves can be cut in the babbitt. The shims involved will have the body portions thereof located between the bearing cap and connecting rod body. The tabs of each shim extend beyond the body element and the connecting rod parts so that the tabs can be grasped with a pair of pliers, or other tool, and separated from the shim itself. Following this, the cap can be removed from the connecting rod, the brass portions of each shim remaining on its respective mating surface of the cap and connecting rod due to the tinning action. The aluminum shims will be free from the brass leaves because of removal of the tabs therefrom, the tinning not effecting a bond between the brass and aluminum. The bearing then can be assembled on the crankshaft, one of the aluminum leaves or body elements being omitted from one shim so that the shim will fit the crankshaft correctly. It is to be understood of course that other uses can be made of the bearing than that just described and various combination of numbers of leaves can be used as well as combinations of materials.

The tabs extending from the body elements of the shim preferably are joined together by means of a rivet means formed by punching a hole through said tabs when the tabs are in assembled relationship. The metal of the tabs in such a punching operation is carried through the tabs so that the metal can be riveted over to hold the tabs together.

The tabs can have scoring, indentations, cuts or holes placed adjacent the point a tab joins a body element so as to facilitate the tearing off of the tab from the body element as just described. The scoring or cuts also will serve to keep the shim leaves from rotating on the joining rivet relative to each other. It is also possible to arrange the rivets, scoring, or weakening means so as to indicate the number of leaves in a shim.

These and other objects, advantages, and features of the invention will become apparent in the following description and drawings which are merely exemplary.

Figure 1 is a fragmentary perspective view of a connecting rod with the bearing cap removed therefrom and shims ready to be inserted therein.

Figure 2 is similar to Figure 1 but with the parts in assembled relationship.

Figure 3 is an end view of a connecting rod after it has been babbitted and with the shim tabs indicated as having been removed.

Figure 4 is a sectional view along the line 4—4 of Figure 3.

Figure 5 is an enlarged sectional view taken along the line 5—5 of Figure 4.

Figure 6 is an enlarged sectional view taken along the line 6—6 of Figure 4.

Figure 7 is a fragmentary perspective view after the bearing has been disassembled following the assembly operation of Figure 3.

Figure 8 is a plan view of one form of a shim.

Figure 9 is an enlarged sectional view taken along the line 9—9 of Figure 8.

Figure 10 is a perspective view of the shim of Figure 8 showing part of the leaves raised.

Figure 11 is a modified form of shim.

Figure 12 is still another form of shim.

The invention will be described particularly in conjunction with the assembly of a connecting rod for an internal combustion engine or similar device but it can be used for other purposes.

Shims, indicated generally at 20 and 21 (Fig. 1) each comprise a plurality of body elements as will be described hereafter in detail having tabs 22 and 23 extending beyond the body elements. In Figure 10 may be seen one form of shim wherein the body elements 24, 25, 26 and 27 have tabs 28, 29, 30 and 31 extending respectively from said body elements, said body elements and tabs forming the leaves of the shim. The shim may have an aperture 32 cut therein for the purpose of receiving the bolts 33 and 34 of the connecting rod 35. The body elements 24—27, inclusive, of the shim are formed in accordance with the shape 36 and 37 of the mating surfaces of the connecting rod bearing 35 and the bearing cap 38, and have substantially the same outline. Tabs 28—31, inclusive, are arranged so that they will be outside of the connecting rod and bearing cap contour or shape when the cap is assembled on the connecting rod. The tabs 28—31, inclusive, can be joined by a rivet means or other suitable joining means so as to hold the plurality of body elements in stacked relationship.

As will be described hereafter, an indentation or scoring 40 (Figs. 8, 9, 10) can be cut in the shim adjacent the point of joinder of tabs 28—31, inclusive, with the body elements 24—27, inclusive. The number of leaves or body elements in each shim or shim assembly will depend upon the specific use for which the shim is adapted.

The shim can be made by bringing together the selected metal strips from which it is to be fabricated in their desired stacked relationship. The stacked strips then can be fed through a suitable punching machine wherein the strips can be riveted or fastened together, scoring or weakening cuts made, and then the body elements with joined tabs extending therefrom punched from the stacked strips. As one example of the manner in which the shim can be formed, reference is made to applicants' copending application, Serial Number 15,308, filed March 17, 1948.

As mentioned previously, the invention will be described particularly in conjunction with a connecting rod bearing wherein the cap is assembled to the connecting rod with shims therebetween, the babbitt bearing formed therein, and then the cap removed from the connecting rod. In such an instance it is desirable to be able to decrease the thickness of one or both shims so as to obtain the correct fit when assembly is made with a crankshaft. The shim leaves may be of varying thickness such as between .001 inch to .010 inch or thicker if desired, .002 inch being preferred. The shims may be made of various metals, although, as will be explained hereafter, brass is preferred for the outer leaves and aluminum or other material for the inner leaves.

The connecting rod 35 (Fig. 1) has conventional bolts 33 and 34 for holding bearing cap 38 in assembled relationship thereto. The shims 20 and 21 are put into position and the cap assembled on the connecting rod, (Fig. 2). In the particular instance involved, shim 20 may have two exterior leaves of brass and one interior leaf of aluminum. Shim 21 may have two exterior leaves of brass and two interior leaves of aluminum. When in assembled relationship (Fig. 2) tabs 22 and 23 (not shown) extend outside of the bearing cap and connecting rod.

After the connecting rod and cap have been assembled, the lower end of the assembly is dipped into a tinning bath prior to the babbitting operation. When the bearing is tinned, the brass leaves will become tinned so that they will be attached to metal portions of the connecting rod and cap respectively.

The bearing assembly then has a mandrel placed therethrough and the babbitt bearing is formed in the bearing assembly in any desired manner. The formed babbitt bearing can, at this time, be machined to provide oil grooves 42 and 43.

At any time after assembly of the cap on the connecting rod and before the bearing cap is disassembled from the connecting rod, the tabs 22 and 23 may be removed as indicated in Figures 3, 4, 5 and 6, thus detaching the individual body elements of the shims from each other. The bearing then is disassembled as shown in Figure 7, the brass leaves 44 sticking to the connecting rod 35 and bearing cap 38 respectively. Inasmuch as the aluminum will not become tinned and therefore joined to the brass, the aluminum leaves will be easily separable from the other leaves of the shim. It is then possible, if desired, to remove aluminum body element 45 from the shim before the bearing and bearing cap is reassembled on to a crankshaft, the element preferably being removed from the shim having two aluminum body elements. Upon reassembly, the aluminum body elements 49 and 50 are kept between the brass body elements.

It is evident that materials other than brass and aluminum may be used in the above described assembly of a connecting rod bearing. For the particular connecting rod bearing assembly just described, the metal next to the bearing cap and connecting rod preferably should be one that will become tinned or bonded to the rod and bearing cap when the assembly is tinned or otherwise treated. The body elements inside of the brass body elements should be of a material that will not become tinned or joined to the other body elements during the assembly of the connecting rod and bearing. It is understood of course that the materials depend upon the use of the shim and that the shim may have all of its elements of the same material.

A weakening means preferably is cut or formed in each shim leaf adjacent the point where the tab joins its body element. A cut 40 (Figs. 8-10) is one form of weakening means that can be used. Other forms are shown in Figure 12 wherein two cuts are used or in Figure 11 wherein a series of small holes 47 are punched. As previously mentioned, the weakening means preferably is formed so as to assist in keeping the body elements in their correct assembled relationship including preventing turning of the elements relative to each other on the rivet.

In order to identify the number of leaves assembled in the shim, one or two rivet means can be used in a tab to indicate one or two interior leaves respectively. The scoring or weakening means also can be formed as indicia of the numbers of leaves in the assembly. Also the particular manner in which the tabs are rounded can serve as indicia of the numbers of leaves.

By use of the present invention, it is a simple matter for a person assembling an article, such as a connecting rod prior to forming a bearing therein or otherwise, to pick up a shim having the desired number of leaves therein and place the shim between the cap and connecting rod. The tabs joined to the shim body elements can be separated from the body elements with the bearing parts in tightly assembled relationship so that upon disassembling of the connecting rod, the desired shim body elements can be removed before putting the connecting rod in place on the crankshaft. In the shim of the present invention, the body elements are not bonded to each other and are held together only by the tab joining means and therefore are easily separable when the tabs are detached.

Various combinations of material and shapes of the body elements can be employed according to the use of the shim. Also more than one tab can be used. The tab could be formed so as to extend from any part of the body element, such as for example, inwardly of the connecting rod bearing. In this last case, the tab might be removed by the machining operation in finishing the bearing. It is apparent that various details of the invention described herein can be varied without departing from the spirit of the invention except as defined in the appended claims.

We claim:

1. As an article of manufacture, a shim having a plurality of stacked body elements with tabs extending from said body elements, and rivet means joining said tabs together to hold said body elements in assembled relationship, said tabs being separable from said body elements to detach said body elements from each other.

2. As an article of manufacture, a shim having a plurality of stacked body elements with tabs extending from said body elements, and rivet means formed from the material of at least one of said tabs and extending through said tabs to hold said body elements in assembled relationship, said tabs being separable from said body elements to detach said body elements from each other.

3. As an article of manufacture, a shim having a plurality of stacked body elements with tabs extending from said body elements forming shim leaves, there being a weakening of the shim leaves adjacent the point of joinder of a tab with its body element, and means joining said tabs to hold said body elements in assembled relationship, said tabs being separable from said body elements to detach said body elements from each other.

4. As an article of manufacture, a shim having a plurality of stacked body elements with tabs extending from said body elements forming shim leaves, there being a scoring of the shim leaves adjacent the point of joinder of a tab with its body element to facilitate separation of the tabs from their body elements, and means joining said tabs to hold said body elements in assembled relationship, said tabs being separable from said body elements to detach said body elements from each other.

5. As an article of manufacture, a shim having a plurality of stacked body elements with tabs extending from said body elements forming shim leaves, there being a cut in the shim elements adjacent the point of joinder of a tab with its body element, and means joining said tabs to hold said body elements in assembled relationship, said tabs being separable from said body elements to detach said body elements from each other.

6. As an article of manufacture, a shim having a plurality of stacked body elements with tabs extending from said body elements, there being a weakening of the shim leaves adjacent the point of joinder of a tab with its body element, and rivet means joining said tabs together to hold said body elements in assembled relationship, said tabs being separable from said body elements to detach said body elements from each other.

7. As an article of manufacture, a shim having at least three stacked body elements, the outer body elements being formed of a metal joinable by tinning to machine parts, the inner body element being of a material not joinable by tinning to said outer body elements, said body elements having tabs extending from said body elements, and means joining said tabs to hold said body elements in assembled relationship, said tabs being separable from said body elements to detach said body elements from each other.

8. As an article of manufacture, a shim having at least three stacked body elements, the outer body elements being formed of brass or the like, the inner body element being of aluminum or the like, said body elements having tabs extending from said body elements, and means joining said tabs to hold said body elements in assembled relationship, said tabs being separable from said body elements to detach said body elements from each other.

9. As an article of manufacture, a shim having a plurality of stacked body elements with tabs extending from said body elements, and rivet means joining said tabs together to hold said body elements in assembled relationship, said rivet means being formed to serve as indicia of the number of body elements in the stack, said tabs being separable from said body elements to detach said body elements from each other.

10. In combination, relatively movable bearing parts or the like, means holding said parts in assembled relationship, a shim between said parts, said shim having a plurality of body elements and having tabs extending from said body elements outside of said parts when the shim is placed between the parts, and means joining said tabs in assembled relationship, said tabs being separable from said body elements to detach said body elements from each other.

RICHARD SEIPT.
DOUGLAS M. STEVES.

REFERENCES CITED

The following references are of record in the file of this patent:

UNITED STATES PATENTS

| Number | Name | Date |
|---|---|---|
| 1,625,545 | Karmazin | Apr. 19, 1927 |
| 1,635,753 | Johnson | July 12, 1927 |
| 1,768,652 | Yordon | July 1, 1930 |